(12) United States Patent
McCord et al.

(10) Patent No.: US 9,972,014 B2
(45) Date of Patent: *May 15, 2018

(54) SYSTEM AND METHOD FOR INTELLIGENT SALES ENGAGEMENT

(71) Applicant: NewVoiceMedia Ltd., Basingstoke, Hampshire (GB)

(72) Inventors: Alan McCord, Frisco, TX (US); Ashley Unitt, Basingstoke (GB); Mark Fellowes, Hawley (GB); Andrew Carson, Woodley (GB); Selma Ardelean, London (GB)

(73) Assignee: NewVoiceMedia Ltd., Basingstoke (GB)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/393,978

(22) Filed: Dec. 29, 2016

(65) Prior Publication Data
US 2017/0255945 A1    Sep. 7, 2017

Related U.S. Application Data

(63) Continuation-in-part of application No. 15/193,055, filed on Jun. 25, 2016.

(60) Provisional application No. 62/304,926, filed on Mar. 7, 2016.

(51) Int. Cl.
| | | |
|---|---|---|
| G06F 15/18 | (2006.01) | |
| G06Q 30/00 | (2012.01) | |
| G06N 7/00 | (2006.01) | |
| G06N 99/00 | (2010.01) | |
| G06Q 10/06 | (2012.01) | |
| G06Q 10/10 | (2012.01) | |

(52) U.S. Cl.
CPC ............. *G06Q 30/01* (2013.01); *G06N 7/005* (2013.01); *G06N 99/005* (2013.01); *G06Q 10/067* (2013.01); *G06Q 10/1097* (2013.01)

(58) Field of Classification Search
None
See application file for complete search history.

(56) References Cited

U.S. PATENT DOCUMENTS

| | | | |
|---|---|---|---|
| 7,403,904 B2 | 7/2008 | Abe et al. | |
| 8,200,524 B2 | 6/2012 | Narvaez et al. | |
| 8,805,861 B2 | 8/2014 | Boyan et al. | |
| RE45,959 E * | 3/2016 | McCord | H04L 65/1043 |
| 9,275,342 B2 | 3/2016 | Vijayaraghavan et al. | |
| 9,654,633 B2 * | 5/2017 | McCord | H04M 3/5183 |
| 2004/0083195 A1 * | 4/2004 | McCord | H04M 3/5233 706/47 |
| 2008/0288889 A1 | 11/2008 | Hunt et al. | |
| 2010/0165977 A1 * | 7/2010 | McCord | H04L 12/66 370/352 |

(Continued)

*Primary Examiner* — Paulinho E Smith
(74) *Attorney, Agent, or Firm* — Galvin Patent Law LLC; Brian R. Galvin

(57) ABSTRACT

A system for automatically automatic workflow triggering using real-time analytics, comprising an analytics server that receives and analyzes interaction information and a workflow server that produces workflow events based on the analysis, sends workflow events to handlers for processing, retrieves workflow-related data, and produces workflow reports for review, and a method for automatically automatic workflow triggering using real-time analytics.

14 Claims, 14 Drawing Sheets

(56) References Cited

U.S. PATENT DOCUMENTS

| | | | |
|---|---|---|---|
| 2011/0188648 A1* | 8/2011 | Pickering | H04M 3/5183 |
| | | | 379/211.02 |
| 2011/0196716 A1 | 8/2011 | Srinivasan et al. | |
| 2014/0173078 A1* | 6/2014 | McCord | H04L 45/44 |
| | | | 709/223 |
| 2016/0239762 A1* | 8/2016 | McCord | G06N 7/005 |
| 2016/0350663 A1* | 12/2016 | McCord | G06N 7/005 |
| 2017/0132421 A1* | 5/2017 | Unitt | G06F 21/602 |
| 2017/0169325 A1* | 6/2017 | McCord | G06N 3/006 |

\* cited by examiner

SYSTEM AND METHOD FOR INTELLIGENT SALES ENGAGEMENT

CROSS-REFERENCE TO RELATED APPLICATIONS

The present application is a continuation-in-part of U.S. patent application Ser. No. 15/193,055, titled "SYSTEM AND METHOD FOR INTELLIGENT SALES MANAGEMENT", filed on Jun. 25, 2016, which claims the benefit of and priority to U.S. provisional application Ser. No. 62/304,926 titled "SYSTEM AND METHOD FOR INTELLIGENT SALES ENGAGEMENT" filed on Mar. 7, 2016, the entire specification of which is incorporated herein by reference in its entirety.

BACKGROUND OF THE INVENTION

Discussion of the State of the Art

Business-to-Business (B2B) selling has a long history spanning over half a century. The 1960's were dominated by in-person sales pitches, the 1990's and the growth of the internet saw the introduction of email selling and, in the late 1990s, Customer Relationship Management (CRM) systems were deployed. The first decade of the $21^{st}$ century has witnessed the rise of social networks and social media being used as a new channel to generate leads.

The Purchase Funnel

The concept of managing a sales process through a set of pre-defined sales funnel or pipeline states dates back to the late 1800's. In both of these tools, customers are envisioned to enter the funnel possibly with little or no knowledge of the product and progress through stages such as but not limited to deciding whether the product loosely fits into their business needs, gaining more specifics about the product, deciding to purchase the product in principle, negotiating price, and committing to a quote and purchasing the product, among multiple other steps familiar to those skilled in the art. Certain percentages of potential customers are lost at each stage of the progression which is the root of the funnel like visualization and customers, naturally may be treated quite differently at each stage of the process as potential customers with only mild interest in the product drop out and the probability of a sale then increases.

Recently, B2B companies have routinely used software and basic analytics to manage the sales pipeline, practicing management-by-exception for prospects that fall outside the bands of expected sales stage durations.

However today, as customers become more empowered with on-line knowledge and as sellers become more empowered with vast amounts of data about prospects the process is no longer linear. Prospects can enter a funnel at almost any stage and can remain in a stage for long periods of time or jump backward and forward between stages. In both B2B and B2C businesses, customers are doing their own research both online and with their colleagues and friends. Prospects are essentially navigating themselves through the funnel.

The Customer Decision Journey

In an attempt to account for this nonlinear nature of the sales process, an alternative to the linear funnel is the Customer Decision Journey popularized by McKinsey. In this model the journey is circular and prospects move through an ongoing set of touch points before, during, and after a purchase.

The circular Customer Decision Journey is an improvement over the traditional funnel, but it is incomplete for several reasons. One reason is that the state change target from the customer point of view is the experience and not the purchase. The focus is still on the transaction but the goal differs between customer and sale representative. So the Customer Decision Journey is essentially only a circular funnel.

The Customer Engagement Journey

In an attempt to shift the focus from the transaction to the relationship the circular model has more recently been replaced by the Customer Engagement Journey. In this engagement-focused model, transactions occur in the context of the relationship rather than relationships in the context of the transaction. The focus is more on engagement than decision. This can be taken even a step further by considering a User Experience Journey in which opportunities for transactions are strategically inserted.

Need for a New Platform

The Customer Decision Journey, the funnel and other "topologies" described above are widely used today and work satisfactorily in specific cases. However software vendors provide platforms that can handle only certain types of flows and require significant amounts of human design upfront each time they are implemented. These characteristics make them rigid and difficult to adapt to new behavioral patterns and experiences that are rapidly emerging through new means of engagement and transaction on the internet via mobile devices and social networks. As customers become more empowered with on-line knowledge and sellers become more empowered with vast amounts of data a new kind of platform is required to manage the complexity of the sales processes in a more automated way that requires less individualized, up-front human planning and configuration and can dynamically evolve automatically in a way that may be matched by human redesign of programming written for one specialized set of parameters hastily then being retooled for another.

SUMMARY OF THE INVENTION

The current invention is a platform that embodies recent advances in machine learning and optimization technology to automatically learn, evolve and optimize journeys of arbitrary topology within reduced human input. The platform can be pre-configured with predefined topology flows such as pipelines, funnels, decision circles, engagement journeys or other topologies decided in advance by a human. But the system can also learn a topology flow from data or evolve an existing flow to a better one. It can, if permitted, dynamically evolve over time. It is left to the human only to define what a better outcome actually is, and to define the constraining experiences, the evolution and the resources to be consumed.

The three core components of the invention are (i) a flexible mathematical graph software module for accumulating real world events and representing them as transitions that occur between states and manipulating the graphs, (ii) a machine learning module for building predictive models for the transitions between states on the graph, finding anomalies and simplifying the graph, and (iii) an optimization framework for generating decisions and real world actions that increase the value of the overall business objective to be maximized by the platform given a set of business, experiential or financial constraints Of specific importance is that the platform disclosed can self learn and then derive a sales process that strikes an optimal balance between focus on experience, engagement and transaction.

According to a preferred embodiment of the invention, a system for intelligent sales engagement, comprising: a pre-integrated graph module comprising at least a plurality of programming instructions stored in a memory and operating on a processor of a network-connected computing device, a machine learning module comprising at least a plurality of programming instructions stored in a memory and operating on a processor of a network-connected computing device and an optimization module comprising at least a plurality of programming instructions stored in a memory and operating on a processor of a network-connected computing device. The pre-integrated graph module: monitors and captures events from source systems and constructs an event graph of multichannel interactions and attributes including firm demographics and sales rep attributes, automatically reduces the graph to the significant state transitions, effectively reverse engineering the sales process from available actual event data, runs in an adaptive mode where reducing the graph happens periodically or continuously, and supports different pre-defined topologies of funnel, decision circle and engagement journey. The machine learning module: trains a family of predictive machine-learning models (e.g. Distributed Random Forest, Deep Learning) for any transition of interest (or for all transitions) of the reduced graph and performs validation of the accuracy (AUC) of each predictive machine learning model, chooses different model types for different transitions based on model with highest accuracy, model then estimates the conditional probability of the transition from the starting to ending state potentially including all known input attributes at the starting state, accepts variable numbers of input attributes of different types on each state transitions, runs with either full state history with attributes, Markov approximation or hidden Markov model or a hybrid mode; and supports a hidden Markov model to represent the hidden "intent" state of the contact or lead. The optimization module: creates a set of visualizations showing the various resulting performance metrics including conversion rate, representative utilization percent, and total value in the pipeline, uses the trained predictive models as input to an automated optimization phase which recommends specific actions (interactions) to take to optimize the business outcome of prospects flowing through the reduced graph subject to constraints, supports optimization under uncertainty; schedules interactions between agents and prospects to maximize an objective, and configures, in addition to existing model optimization, optimization experiments that are executed and is then able to run experiments, analyze the results and self-learn giving rise to increased utility.

According to another embodiment of the invention, the expected sales process may be entered as input to guide graph reduction and/or highlight deviations from expected flows. Wherein the graph may also represent B2B flows and B2C flows. The machine learning module may learn or reverse engineer a process based on historical data. The machine learning module may account for the multi-dimensional nature of social influence, and the role of advocates who aren't customers. The machine learning module may shift to ongoing relationships beyond individual transactions. The machine learning module runs in an adaptive mode where retraining happens periodically or continuously The optimization module can use the trained predictive models can be used to support a "what-if" user interface for human users to understand the effect of change of attributes or graph structure.

According to another preferred embodiment of the invention, a method for intelligent sales engagement, the method comprising the steps of: (a) monitoring and extracting sets of customer relationship sales data from source systems into a pre-integrated graph module comprising at least a plurality of programming instructions stored in a memory and operating on a processor of a network-connected computing device. (b) constructing an event driven relational graph of multichannel interactions and attributes including firm demographics and sales representative attributes using the pre-integrated graph module. (c) reducing the graph to the significant state transition occurrences, effectively reverse engineering the sales process from available actual event data expressing the resultant graph in one of a plurality of pre-defined topologies such as: funnel, decision circle and engagement journey using the pre-integrated graph module. (d) training a family of predictive machine-learning models, such as Distributed Random Forest, Deep Learning for any transition of interest (or for all transitions) of the reduced graph and performs validation of the accuracy (AUC) of each predictive machine learning model using a machine learning module comprising at least a plurality of programming instructions stored in a memory and operating on a processor of a network-connected computing device. (e) choosing different model types using the machine learning module for different transitions based on model with highest accuracy, chosen model then estimates conditional probability of the transition from the starting to ending state potentially including all known input attributes at the starting state. (f) running either full state history with attributes, Markov approximation or hidden Markov model or a hybrid mode using the machine learning module. (g) creating a set of visualizations showing the various resulting performance metrics including conversion rate, rep utilization %, and total value in the pipeline using the optimization module. (h) using the trained predictive models as input to an automated optimization phase which recommends specific actions (interactions) to take to optimize the business outcome of prospects flowing through the reduced graph subject to constraints using the optimization module.

BRIEF DESCRIPTION OF THE DRAWING FIGURES

DETAILED DESCRIPTION

Figure 1:
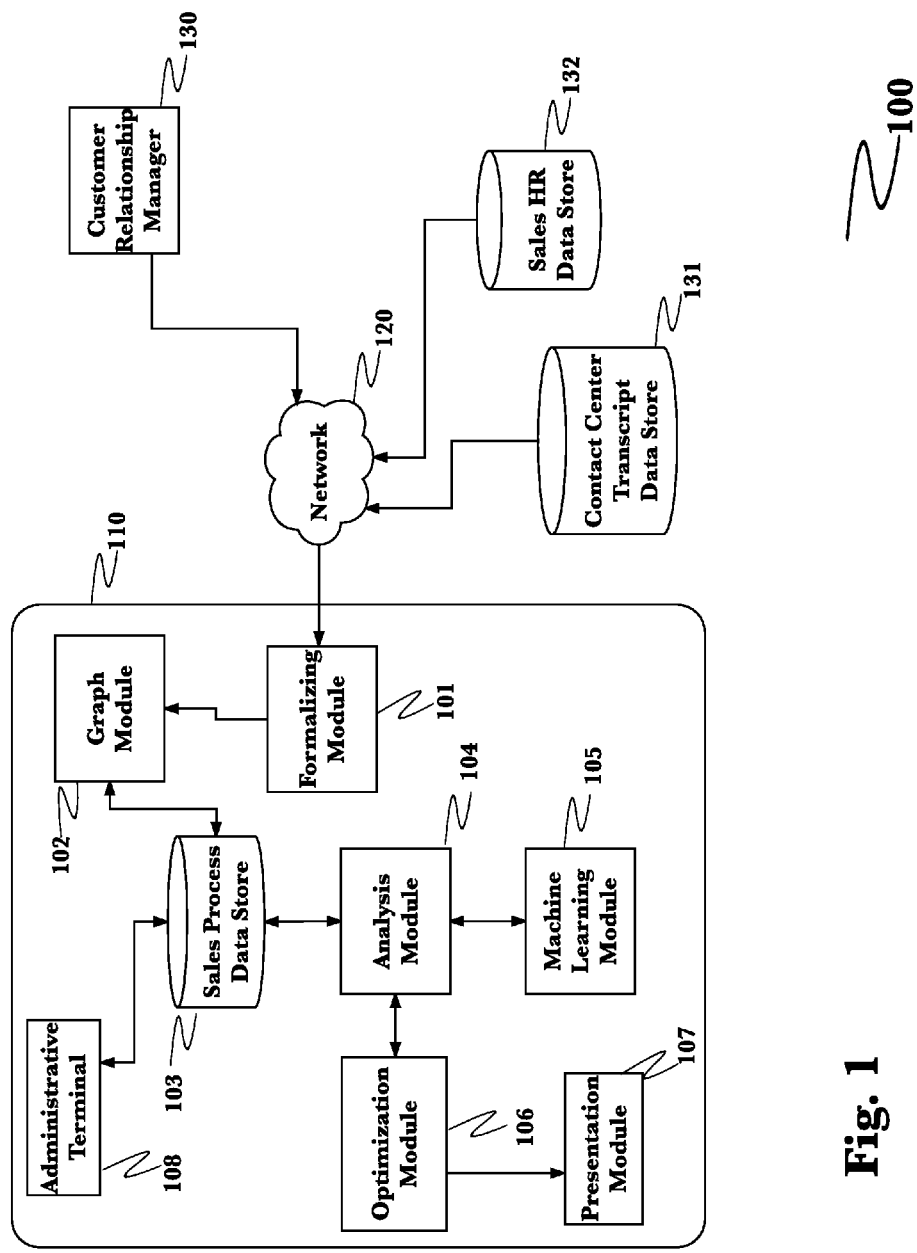
FIG. 1 is a block diagram illustrating an exemplary platform architecture used in an embodiment of the invention.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Conceptual Architecture

FIG. 1 is a block diagram illustrating an exemplary platform architecture used in an embodiment of the invention 100. Some data may be received by the platform 110 from a variety of real-world sources such as, but not limited to a customer relationship manager as time-stamped events 130. Other data is not event-like, consisting of descriptive attributes. One feed of data comes from transcripts of voice telephony and multi-channel communications infrastructure such as a contact center 131. Other data comes from external platforms that serve as a data repository for known information regarding contacts, leads, opportunities and accounts 130. Other data sources provide information about a sale prospects such as firmographic data (in the B2B case) or demographic data (in the B2C case) 132. All data entering the platform from other sources 120, enter a formalization module 101 to remove incomplete or nonsensical data and to format the incoming data such that it may be reliably added to the existing graphical representation.

The graph module 102 takes each event and adds it as a new edge on a directed graph corresponding to a transition between 2 states represented by the event. The additional available data attributes are attached as attributes to either the new edges or to vertices in the graph. The raw event graph (constructed from these raw events) can be large and but be persisted to permanent disk storage 103 if necessary.

The graph module 102 is also responsible for reducing or simplifying the raw event graph to a level that is appropriate for representing significant states and transitions of interest. While continuous reduction saves space and computational overhead, reducing the graph periodically may add endpoint accuracy and speed up the overall operation. By significant we mean states or transitions that capture an important experience, interaction or transaction that is part of the optimization objective or constraint. Two modes are supported. One in which the system statistically determines which experiences, interactions or transactions are present and therefore to be used in subsequent calculations using supervised machine learning (details provided later). The other approach is for a human administrator to provide an "Assumed Sales Process Graph" 108, which defines what is currently believed to be the important states and transitions of interest (and therefore the corresponding experiences, interactions, transactions and value contributions). These constraints may, at the analyst's request, use machine pre-defined programming attempt to fit the data to graph topologies for funnel model customer sales, where many customers may enter at the "top," some will exit at each transaction stage of the process, each of which may require some stage specific action on the part of the seller or the buyer and a number will complete the process by purchasing the product; pipeline where the transaction process is modelled as a plurality of stages which the customer passes through and at which a customer may exit prior to the sale, on the way to the sale with certain actions again, possibly attached to specific stages; the decision circle model, much like the funnel only more focused on buyer relationship experiences as stage demarcation than sales related transactions and the engagement journey model graph which is constructed much the same as the funnel model graph but has the customer focused on relationship experience while the salesperson is focused directly on the sales transaction resulting in specific parameters that must be fit differently than either the funnel or decision circle model.

The machine learning module 105 uses the historical data in the reduced graph to build predictive models of the conditional probability of transition between these states of interest. Baselines are originally acquired by running a plurality sales processes for which the intermediate stages and interactions within them are well defined. This is continued until the analyst determines that the machine is correctly predicting the interactions that should occur in test sales processes correctly, possibly through the use of additional training cases. The system may then be run such that it draws solely upon the training data to predictively analyze new sales cases and predictively suggest the best actions to be taken a specific a stage or multiple stages in an ongoing sale. Changes to the machine predictions will only occur upon the manual addition of further training cases. The system may also be run in an adaptive mode where after predictions are made, the system continues to monitor the status and progression of sales introduced to it. Unexpected the data from results, either negative or positive in a case tracked in this way will be incorporated automatically into the module's range of data for subsequent use when other parameters indicate case similarity. Adaptive mode may also be further modified such that it only re-visits case with specific entering parameters. As a simplified example, one customer company may be considered the standard in sales process and thus only cases pertaining to that one company are re-inspected and possibly details incorporated creating a much more periodic training schedule. This is, of course an extremely simplified example, the system is designed to accept one or parameters from the set known as useful to those skilled in the art. Once trained, the system, using the analyzed data may create a sales process when given just the data that resulted from it.

Module 106 is the optimizer, which takes as input (i) a list of decision variables the optimizer is allowed to manipulate, (ii) an objective function definition to be optimized by changing the decision variables and (iii) a list of constraints (rules) that must not be violated by the output from the optimizer. The optimizer than uses these inputs to form predictive interaction recommendations designed to optimize the sales process arising from them. It should be noted that Optimization problems of this scale may not be solved by traditional linear solver engines, so, optionally, a solver based on Approximate Dynamic Programming (ADP) is used by some embodiments.

The outputs 107 include the values of the decision variables chosen by the optimizer 106, together with various performance metrics calculated by the analyzer 104

Figure 2:
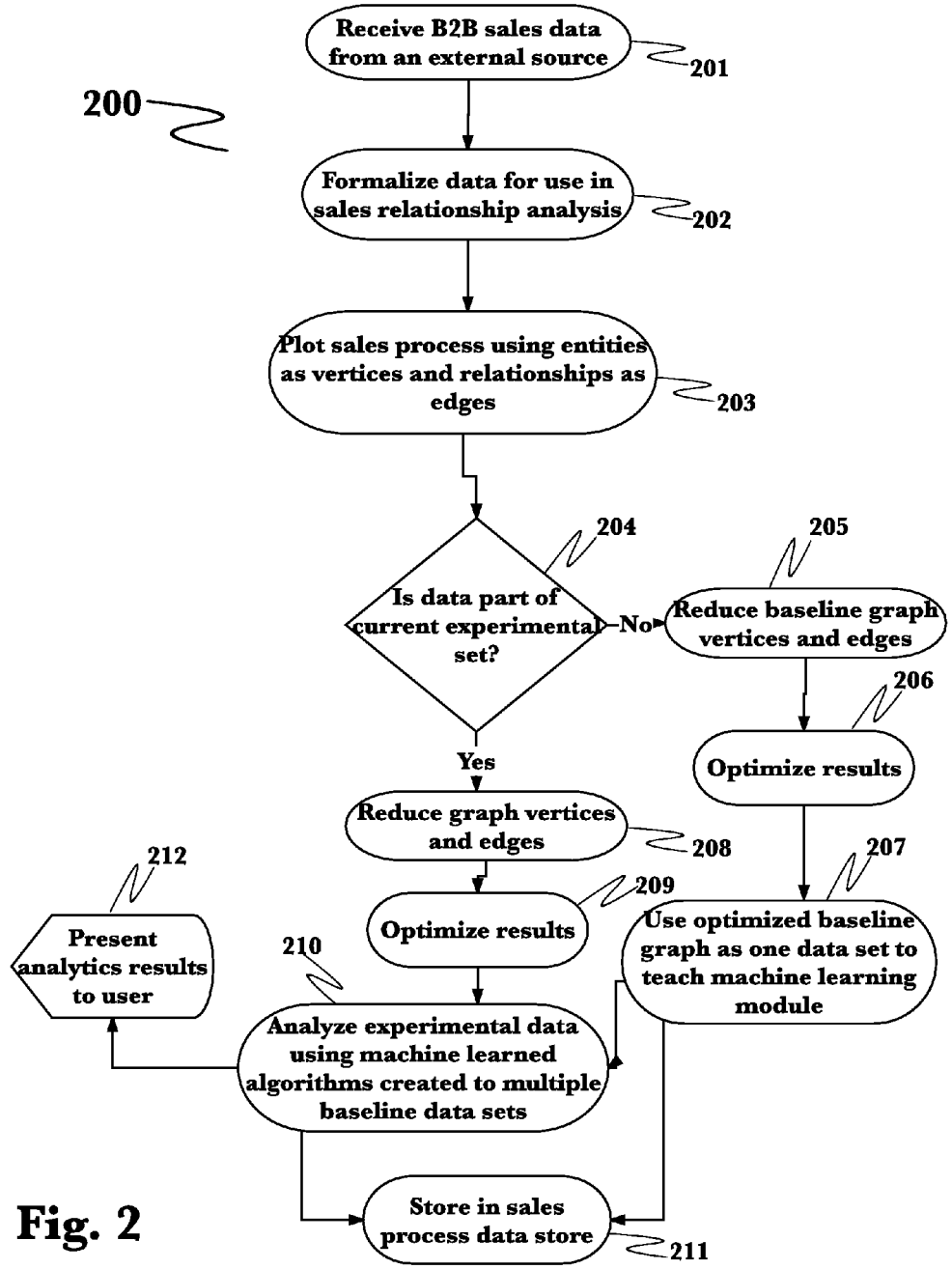
FIG. 2 is a flowchart illustrating an exemplary business to business (B2B) optimization process according to an embodiment of the invention.

FIG. 2 is a flowchart illustrating an exemplary business to business (B2B) sales optimization process according to an embodiment of the invention 200. B2B sales related data may be retrieved from a plurality of external sources such as a company's CRM, the sales employee personality records in HR, notes made about individuals who are prospective customers during meetings, transcripts made from phone conversations with individuals of interest, records of previous sales and public prospect financial disclosures among a great number other sources not listed here but know to those skilled in the field which the invention may also process 201. As the full spectrum of data retrieved comes from a wide set of divergent sources, it may be expected that such data may require formalization to remove un-usable records and normalize data format to a point usefulness in subsequent steps in the optimization process 202. In the example embodiment, the formalized data is plotted graphically with the parties present in the B2B sales process under study forming the vertices of the graph and the relationships between them forming edges 203. One of two pathways can be followed depending on whether the current dataset is highly analyzed control data meant to train the system and form a baseline for the novel data to be analyzed. The steps performed are at first quite similar graph preparation and only differ in what is ultimately done with the graphed data 204. In the case of control data 205 the entire baseline graph which is very large and complex may be reduced in complexity (see FIGS. 10 and 11, FIGS. 12 and 13). The resulting graph may then be optimized to remove vestiges of the reduction process 206 and that resulting graph may be used to teach the machine learning module to recognize important stage markers in successful and unsuccessful sales processes 207. The resulting baseline control graph may then be persistently stored 211. In the case of an experimental data graph which has been submitted for analysis of contained sales process progress, again the complex graph of the full experimental dataset is reduced 208 and the graph optimized 209. The optimized, reduced experimental graph is then subjected to system analysis 210 and the results of analysis both presented to the analyst 212 and persistently stored for later use 211.

Figure 3:
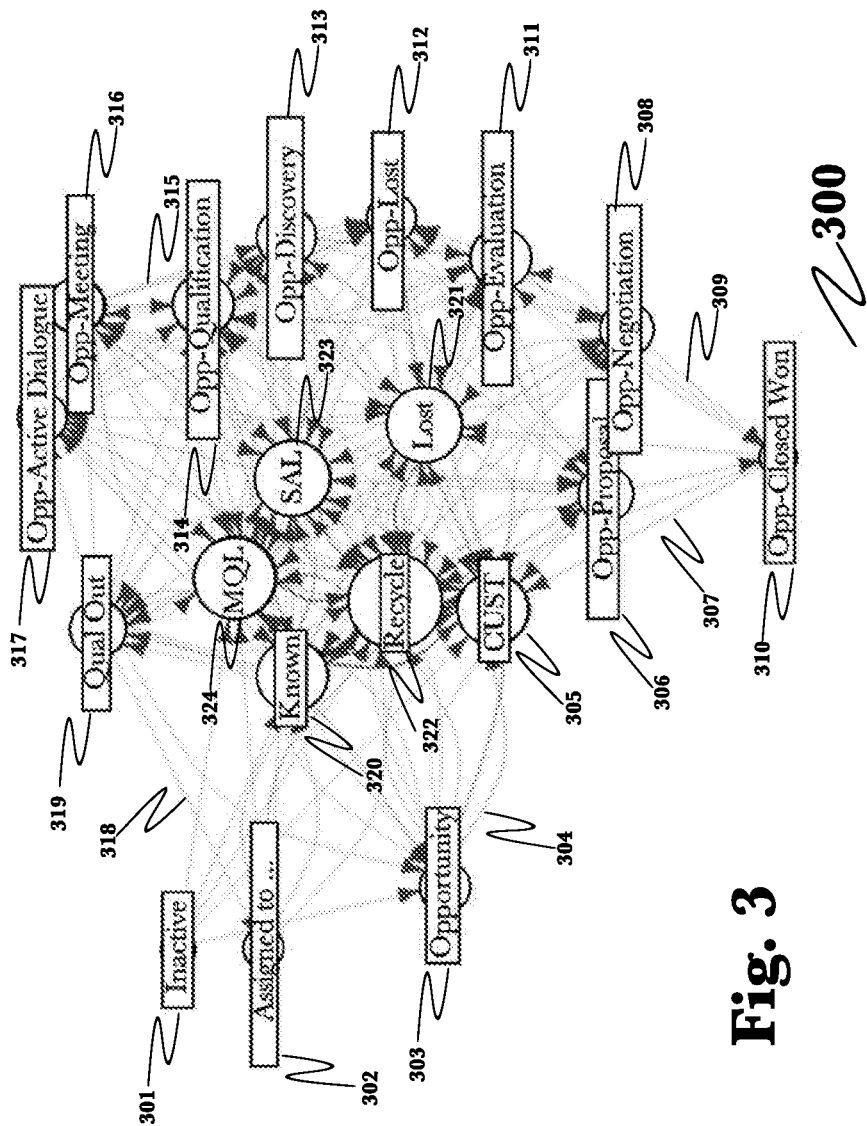
FIG. 3 is a diagram illustrating an exemplary graph of state transitions, according to an embodiment of the invention.

FIG. 3 is a diagram illustrating an exemplary graph of state transitions, according to an embodiment of the invention 300. Vertices represent communities, labelled groups in standardized stages of the B2B sales process placed on the graph by the embodiment which may include stages such as, but not limited to: "inactive" 301, assignment 302, "Known" 320 where contact information has been exchanged but not much else about the contact is known, "opportunity" 303, where subsequent contact has been made and at least some interest on the part of the contact is expressed, "lost" 321, where subsequent contact generated no interest, "Opp-Discovery" 313 which represents a status similar to "opportunity," "Opp-active dialog 317" and "Opp-meeting 316" are again very close in meaning, "Opp-Qualification" 314 is an umbrella for 324 "marketing qualified lead and 323 "sales accepted lead" although SAL 323 requires more foreknowledge of the customer 305, "Opp-proposal" 306 signifies that dialog has progressed to the point where the possible customer wants a sales plan and quote put together for their evaluation 311 with the last steps being "Opp-negotiation" 308 and then, eventually "Opp-Closed Won" 310 if a sale was made or "Opp-Lost" 312 if the opportunity soured and the sale was lost. "Qual-Out" 319 failure of the customer to qualify, perhaps due to finances, perhaps due to geographical location, may also occur as does "Recycle" 322, signifying a temporary cessation of the sales process with a known pick up timeline set. The edge weights 304, 307, 309, 315, 318 are based on transition probability and/or value. The filters are on edge weights, counts, % or % of log(count). It is possible that different cases may progress differently through the pre-defined stages with some progressing through more and others progressing through less. The invention is designed to accept case determined numbers of input attributes of different types on each state transition. The graph shows attributes on edges or vertices.

Figure 4:
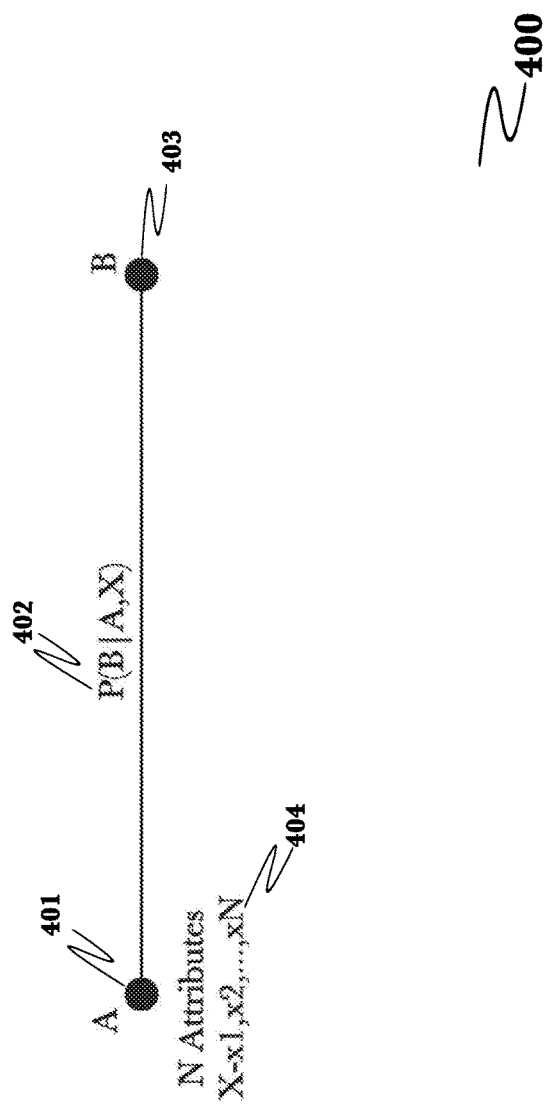
FIG. 4 is diagram showing an exemplary of simple conditional transition probability between two states, A and B, according to an embodiment of the invention.

FIG. 4 is diagram showing an exemplary of simple conditional transition probability between two states 400, A 401 and B 403, according to an embodiment of the invention. The simple case of a transition between two states where there is only one possible path is shown. A supervised machine learning model can be trained using historical examples of this transition that include the N attributes x1, x2, . . . , xN known on input at state A 404. Cases that arrived at B 403 are labeled success. The machine learning model can then be used to compute the probability of an entity in state A 401 transitioning to state B 403 for various values of x1, . . . , xN 404 with that probability represented P(B|A,X) 402.

Figure 5:
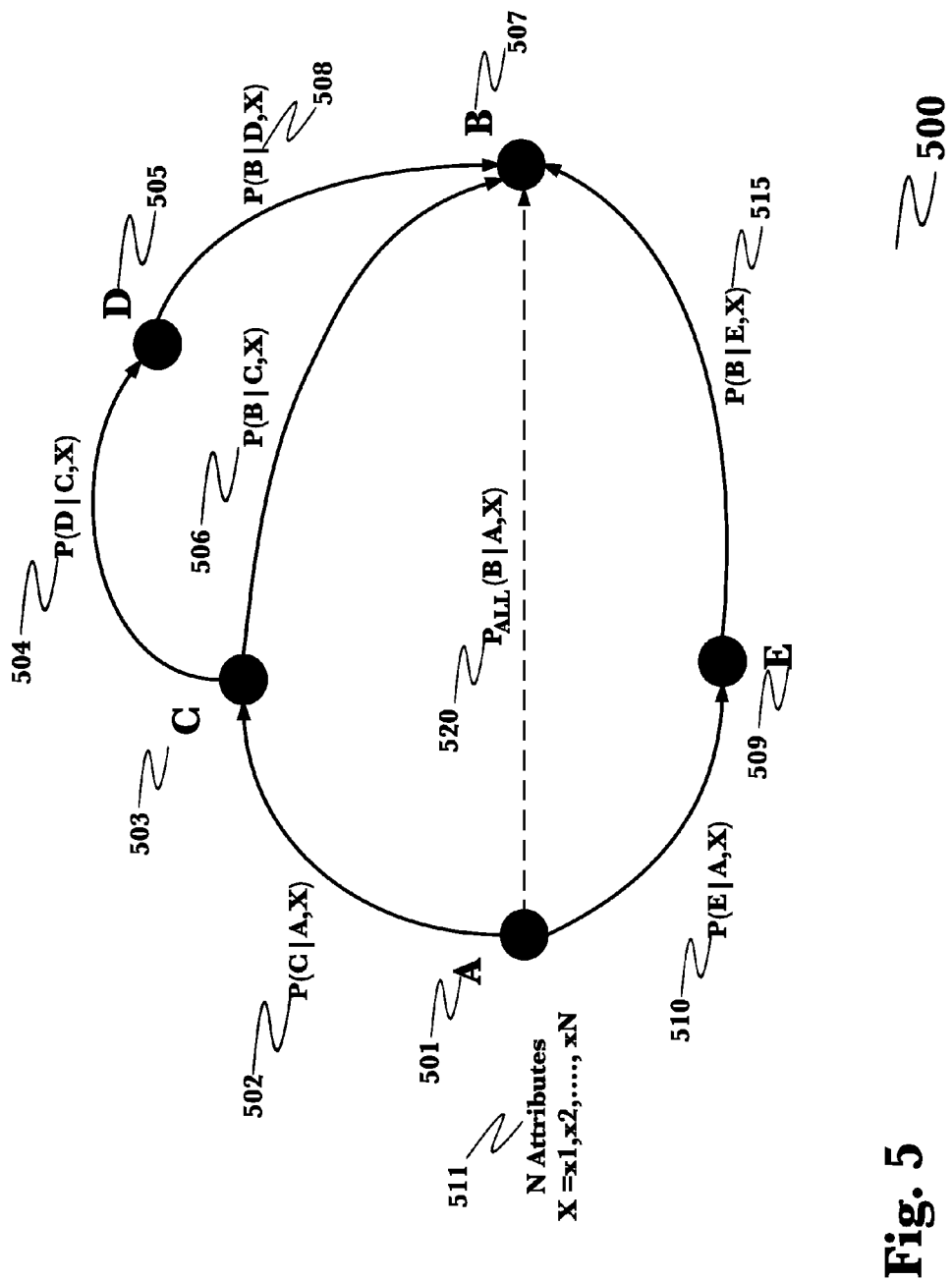
FIG. 5 is flow diagram illustrating virtual transition probability between states A and B according to an embodiment of the invention.

FIG. 5 is flow diagram illustrating virtual transition probability 500 between states A 501 and B 507 according to an embodiment of the invention. A more typical case is shown. Where there are many possible pathways between A 501 and B 507. Note that the direct transition A 501 to B 507 may not occur in the historical data. Nevertheless, by taking all historical data cases that started at A 501 and labeling those cases as successful that completed in B 507 then we can again train a supervised machine learning model to compute the transition conditional probability $P_{ALL}$ from A to B given the known parameters X at A. But of course $P_{ALL}(B|A,X)$ 520 says nothing about how the cases that did not make it to B are distributed across states (A 501, C 503, D 505 and E 509). The probabilities of transition between each of the alternate pathways are expressed in equations 502, 504, 506, 508, 515 and are once again based on the value of X progressive over N states 511. In the case where the X are the same on all states then this reduces to a Markov Chain.

Figure 6:
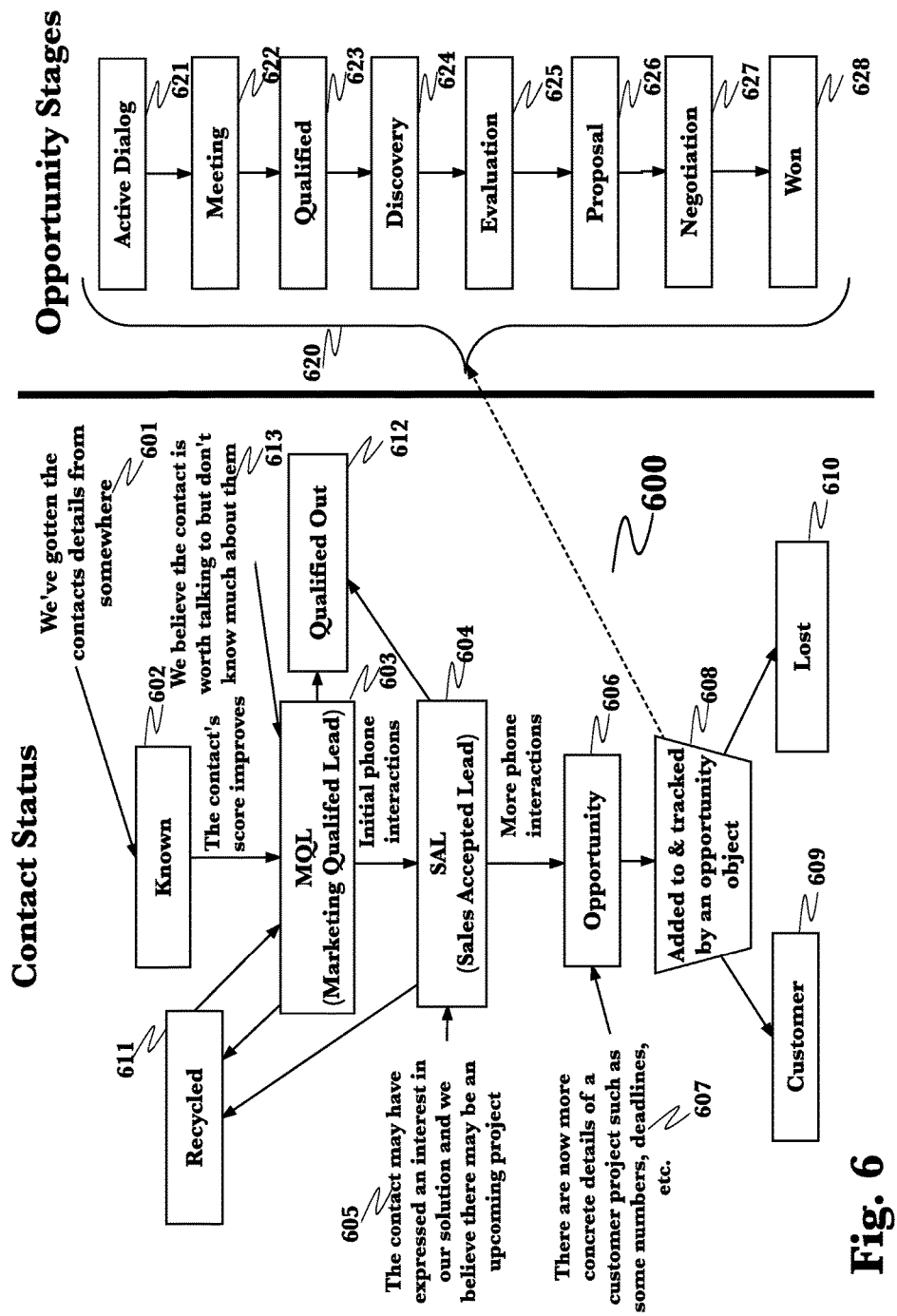
FIG. 6 is a block diagram of an exemplary state model for contact and opportunity, according to a preferred embodiment of the invention.

FIG. 6 is a block diagram of an exemplary state model for contact and opportunity, according to a preferred embodiment of the invention 600. As an example of one of many possible applications of the platform we focus in this section on a B2B use case of customer interactions in the pre-pipeline. By interactions we mean here information exchange events such as a human-to-human phone call, an email, text message, customer initiated product investigation, customer use of social media contacts to explore both the product and the manufacturer's performance, etc. In this "pre-pipeline" case we wish to optimize the interactions that take place between a selling agent and an individual prior to the first human face-to-face meeting in the sales process. The post-human-meeting sales pipeline is well understood and there is considerable prior art in this area.

Here we start with the onset of customer/sales contact where the customer is known 602 in that some amount of contact information but nothing else has transpired 601. The known contact may then become a marketing qualified lead 603, so may be further contacted 613. After some initial phone conversations where the contact may express interest in the solution being sold 605 the new customer may be designated as sales accepted (SAL) 604. If something goes wrong, for example the customer may not express interest in the product the contact may be removed from the sales process completely 612 or may be recycled if the product is, for example, a PBX phone system and the contact currently has 2 employees but is expanding quickly 611. After one or more further phone interactions where positive progress is made towards a sale, the relationship may be designated an opportunity 606, 607. It is at this time that the contact may be assigned 608 to an opportunity object 620 until the opportunity is either won 609, a sale is made, or lost, the contact moves on 610. For tracking purposes, the possible customer is assigned, in turn, to progressive, labeled, trackable stages: Active dialog 621, Meeting 622, Qualified 623, Discovery 624, Evaluation 625, Proposal 626, Negotiation 627, and Won 628. These stages are part of the pipeline that is officially tracked.

Good "pre-pipeline" management requires a deeper linkage between more traditionally separate sales and marketing responsibilities. Providing the correct information in an appealing manner on the company's web site, tracking independent reviews and buyer criticisms and attempting to resolve the issues, confirming service after the sale interactions are positive and fruitful are all important factors towards building social media community advocates in the internet age. Those just listed in addition to other marketing and sales factors known to influence sales success by those skilled in the art. The platform is designed to capture and incorporate the influence of all of these internet related marketing factors as pre-pipeline stage data in predictive analysis of a sales case during optimization of the graph. In essence the platform represents the application of the next generation of sales operations techniques in the of domain sales development.

Figure 7:
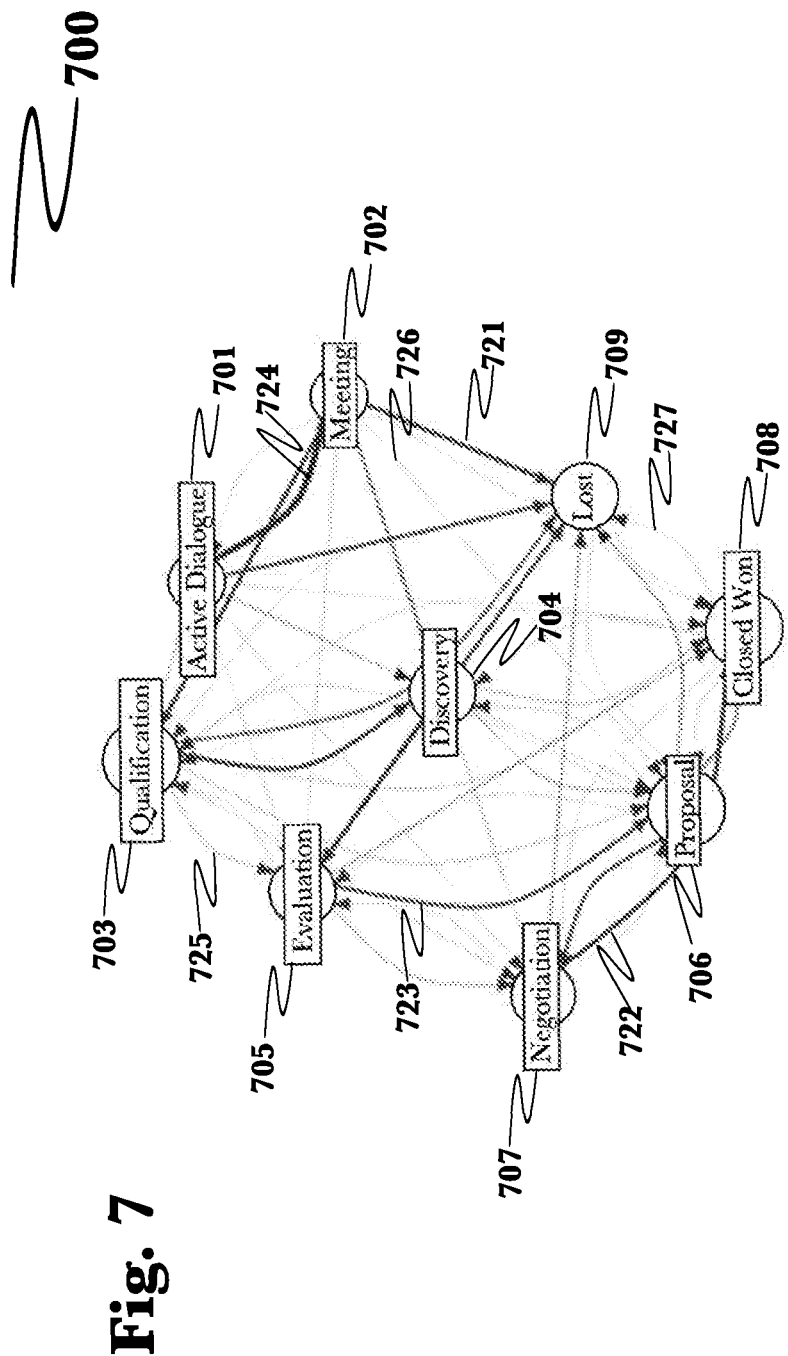
FIG. 7 is a flow diagram of exemplary opportunity state changes according to an embodiment of the invention.

FIG. 7 is a graph diagram of exemplary opportunity state changes according to an embodiment of the invention 700. Good "pre-pipeline" management really requires a deeper linkage between more traditionally separate sales and marketing responsibilities. In essence the platform represents the application of the next generation of sales operations techniques in the of domain sales development. Shown is a transition graph generated by an embodiment of the invention as shown previously, pre-pipeline groups, under standardized labels become the vertices of a graph. Those standardized labels include, non-exhaustively Active dialog

701, Meeting 702, Qualification 703, Discovery 704, Evaluation 705, Proposal 706, Negotiation 707, and Closed Won 708. As these terms have already been defined 100, 600 and are somewhat self-explanatory, they are not re-defined here. The value of the system here is found in the edges of lines between the vertices. The system draws the weight of those edges 721, 722, 723, 724, 725, 726, 727 according to the likelihood of the transition between them to occur under the experimental conditions that have generated the data and therefore shows what activities done at what stage are likely to result in success.

Figure 8:
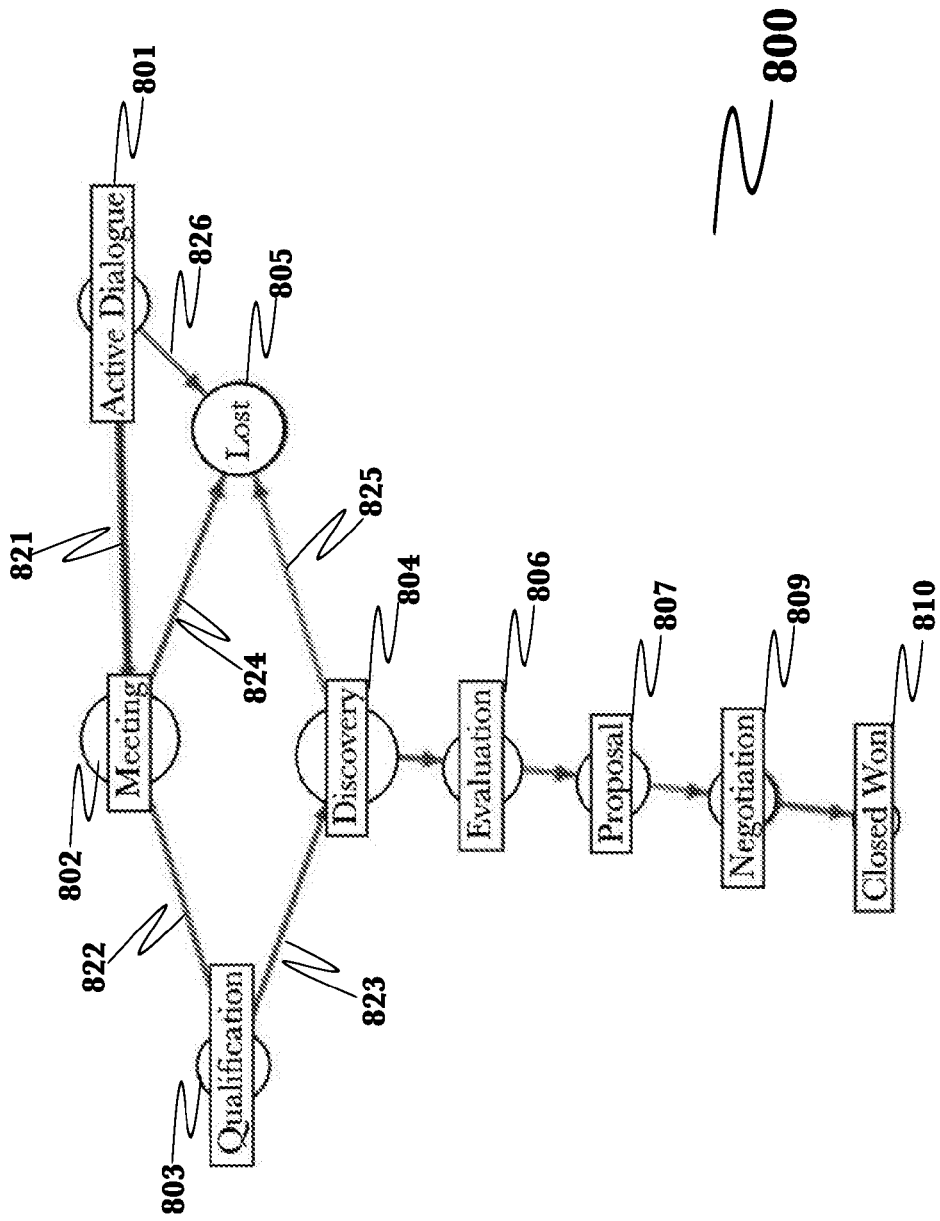
FIG. 8 is a flow diagram of opportunity state changes according to an embodiment of the invention.

FIG. 8 is a graph diagram of opportunity state changes according to an embodiment of the invention 800. In this use case the ISEP platform provides the insight, modeling and optimal management of the interaction sequences and interaction types to drive the creation of a B2B meeting or opportunity. This simplified graph includes many of the previously mentioned sales pipeline stages 801, 802, 803, 804, 805, 806, 807, 809, 810 with focus placed on the early stages of the process 801, 802, 803, 804, 805. The graph then shows the strength of the transition state probabilities between those stages 821, 822, 823, 824, 825, 826 with the highest affinities (line weight) being 821, 822, 823 and 824 between Active dialog 801, and Meeting 802, Meeting 802 and Qualification 803, Qualification 803 and Discovery 804 and Meeting 802 and Lost 805. The other transition affinity edges 825 and 826 are weaker, lesser line weights.

Figure 9:
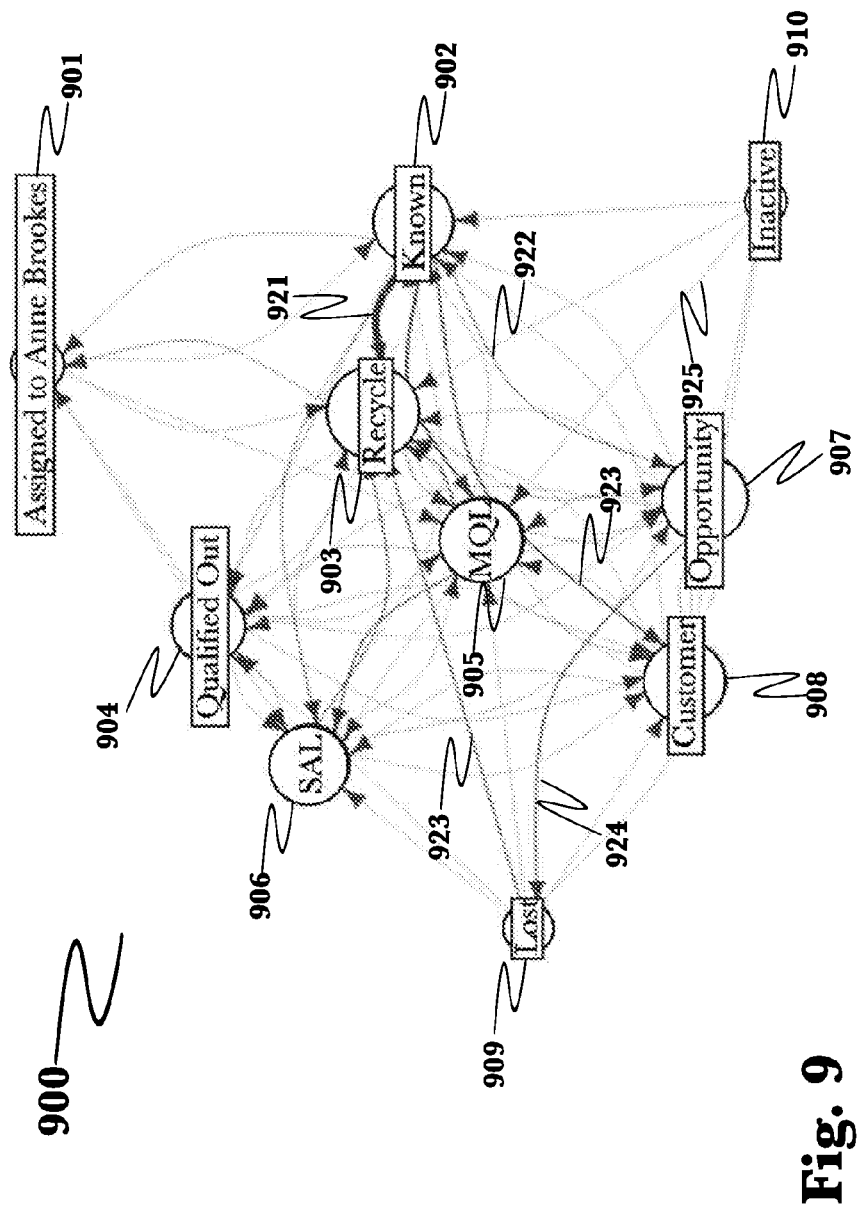
FIG. 9 is a flow diagram of exemplary contact state changes according to an embodiment of the invention.

FIG. 9 is a graph diagram of exemplary contact state changes according to an embodiment of the invention 900. The output decision variables are configurable but would typically include the sequence of activities (interactions) to perform and the individual sales reps to be assigned to the interactions. Shown is a contact state transition graph generated by an embodiment for sales leads given to a specific sales person, in this example "Anne Brookes" 901. It can be seen that the salespersons known contacts 902 transition predominantly 921 to the Recycle state 903 which is not optimal with some going to MQL 905 and others to Customer 908. A lesser number go to Opportunity 907, 922 and a significant portion go from Opportunity 907 to 924, Lost 909, again, an unfavorable outcome. Other stages such as SAL 906, Qualified Out 904 and inactive 910 are also depicted but transition probabilities to and from these are much lower as represented by lines of lesser weight 925.

Figure 10:
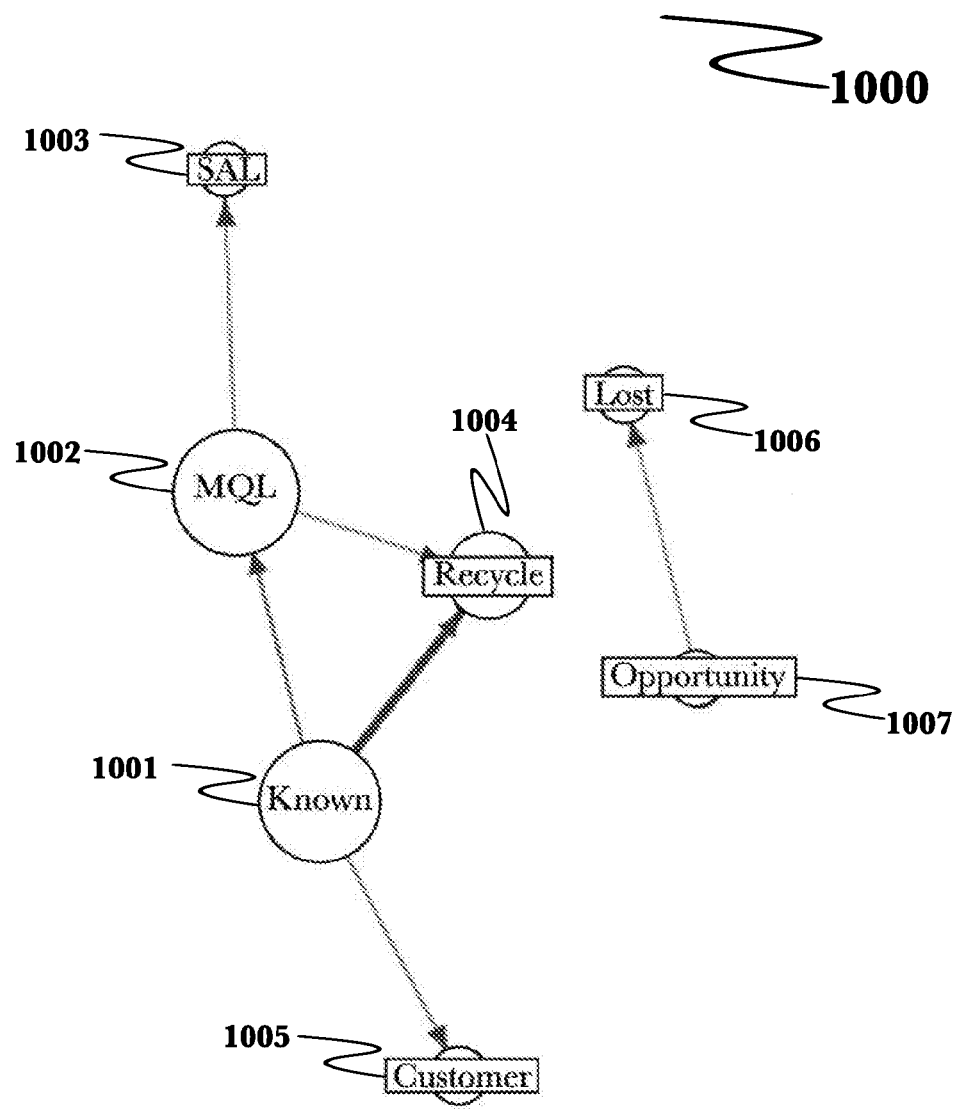
FIG. 10 is a flow diagram of a second aspect of contact state changes according to an embodiment of the invention.

FIG. 10 is a flow diagram of a second aspect of contact state changes according to an embodiment of the invention 1000. Certain interactions lead to opportunity conversion % by lead source. Certain interactions lead to opportunity conversion % by segment. Certain interactions lead to opportunity conversion % by region. Certain interactions Lead to opportunity conversion % by tenure of sales rep. The graph measures hit rate (as previously defined), by lead source by segment, by region. Target Rollover % (% of value of opps with a close date in a period that roll into the following period) by segment, by region and by sales person 1001, 1002, 1003, 1004, 1005, 1006, 1007.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 11:
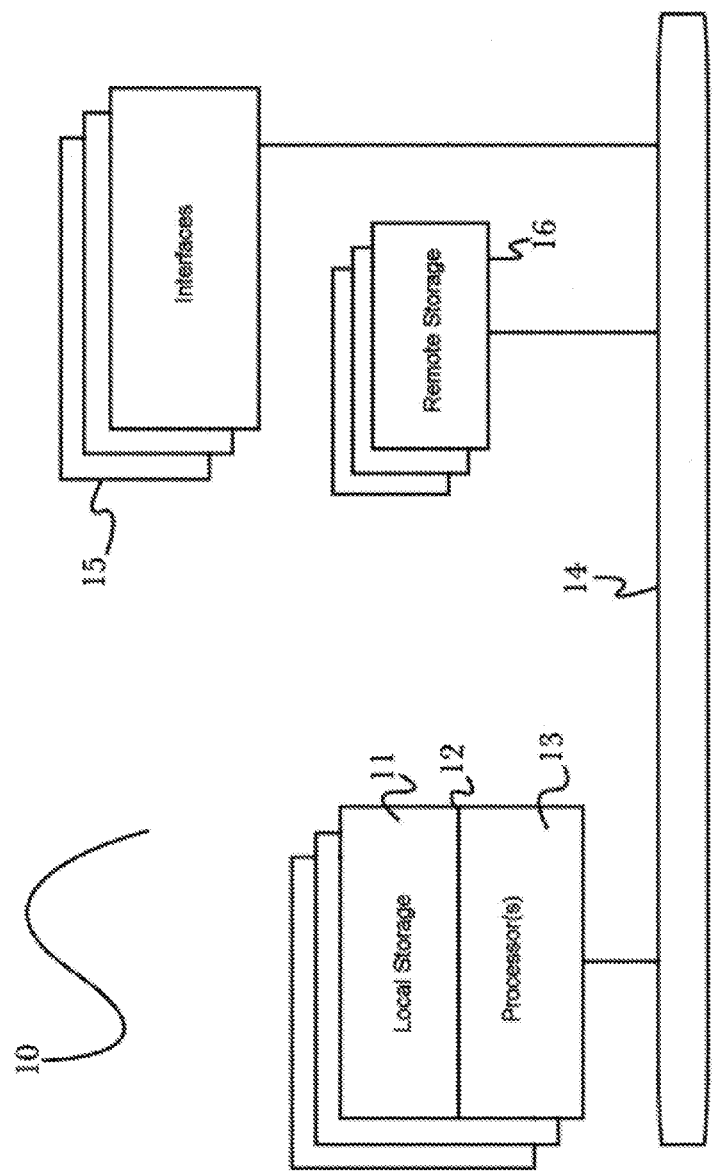
FIG. 11 is a block diagram illustrating an exemplary hardware architecture of a computing device used in an embodiment of the invention.

Referring now to FIG. 11, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM)

and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 12:
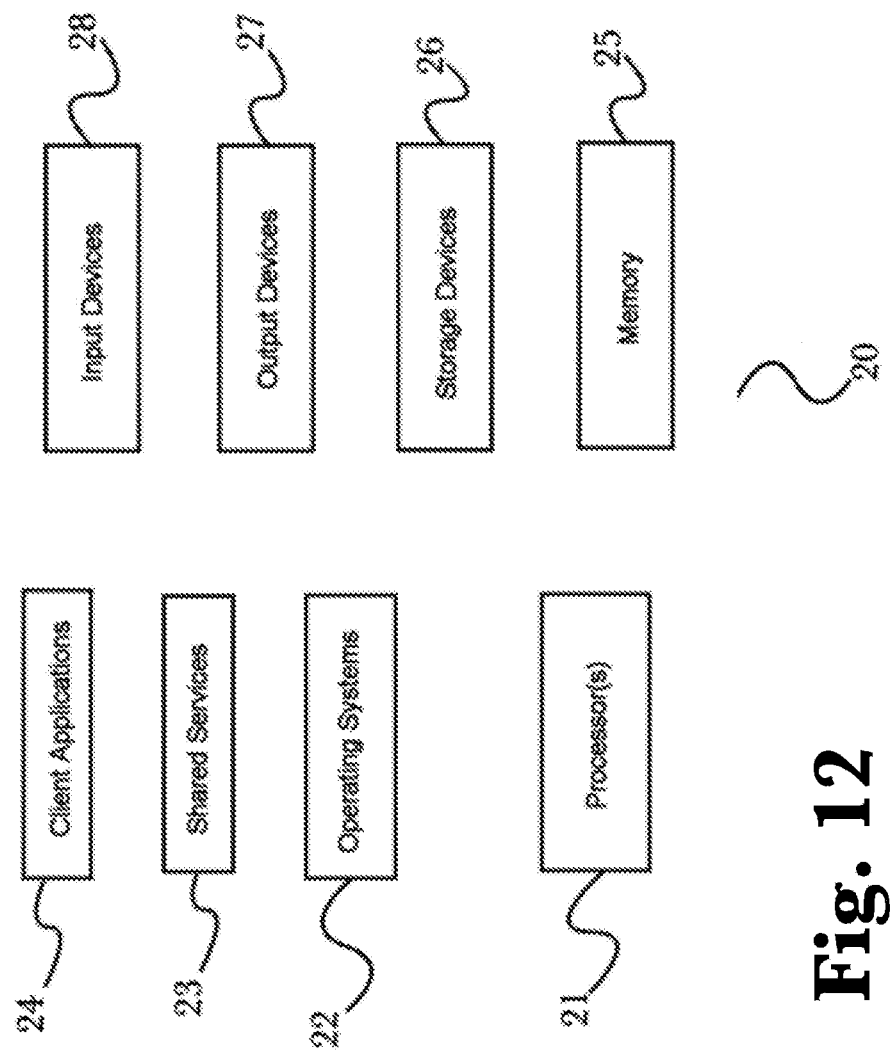
FIG. 12 is a block diagram illustrating an exemplary logical architecture for a client device, according to an embodiment of the invention.

In some embodiments, systems according to the present invention may be implemented on a standalone computing system. Referring now to FIG. 12, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 13:
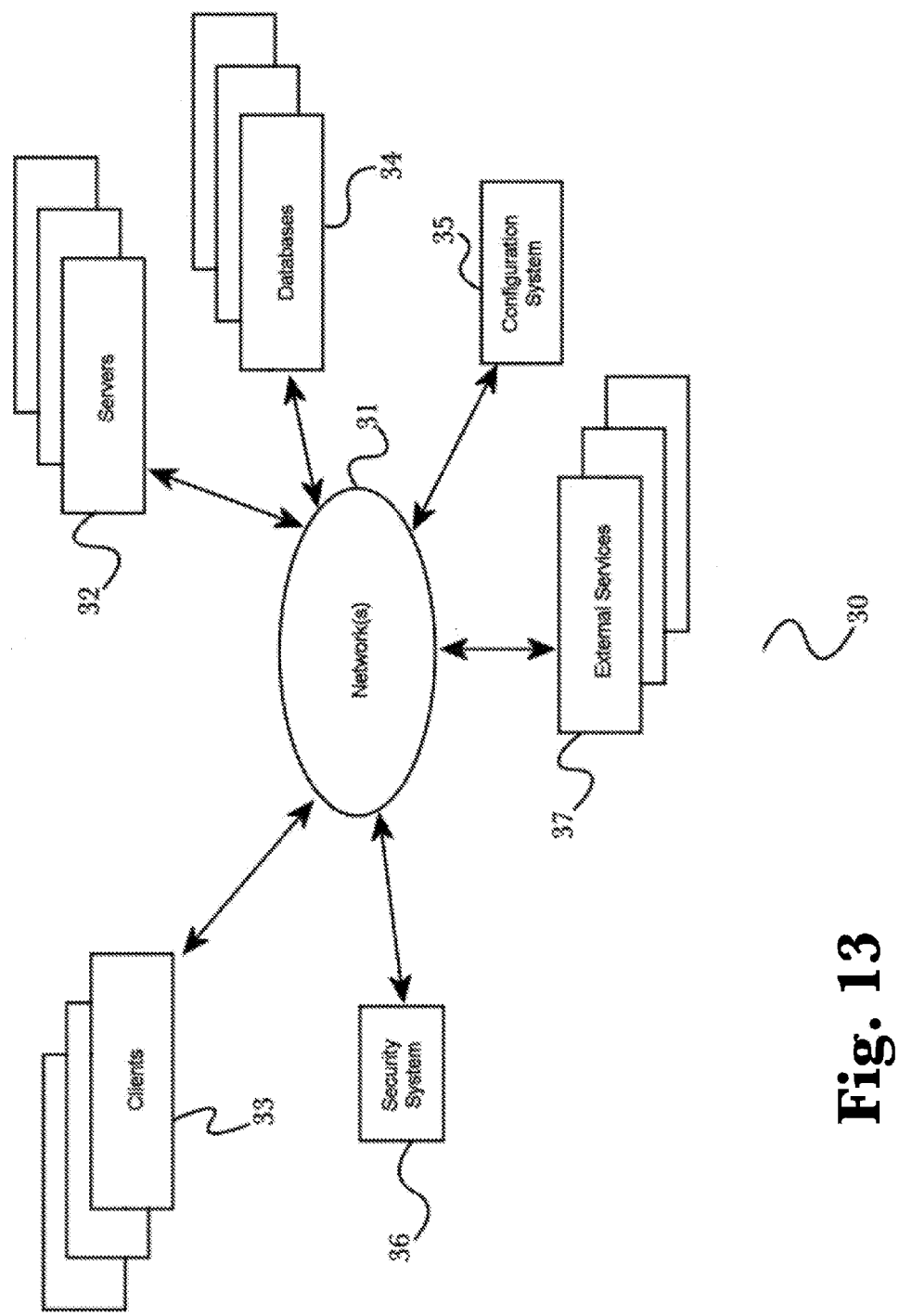
FIG. 13 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 13, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 14:
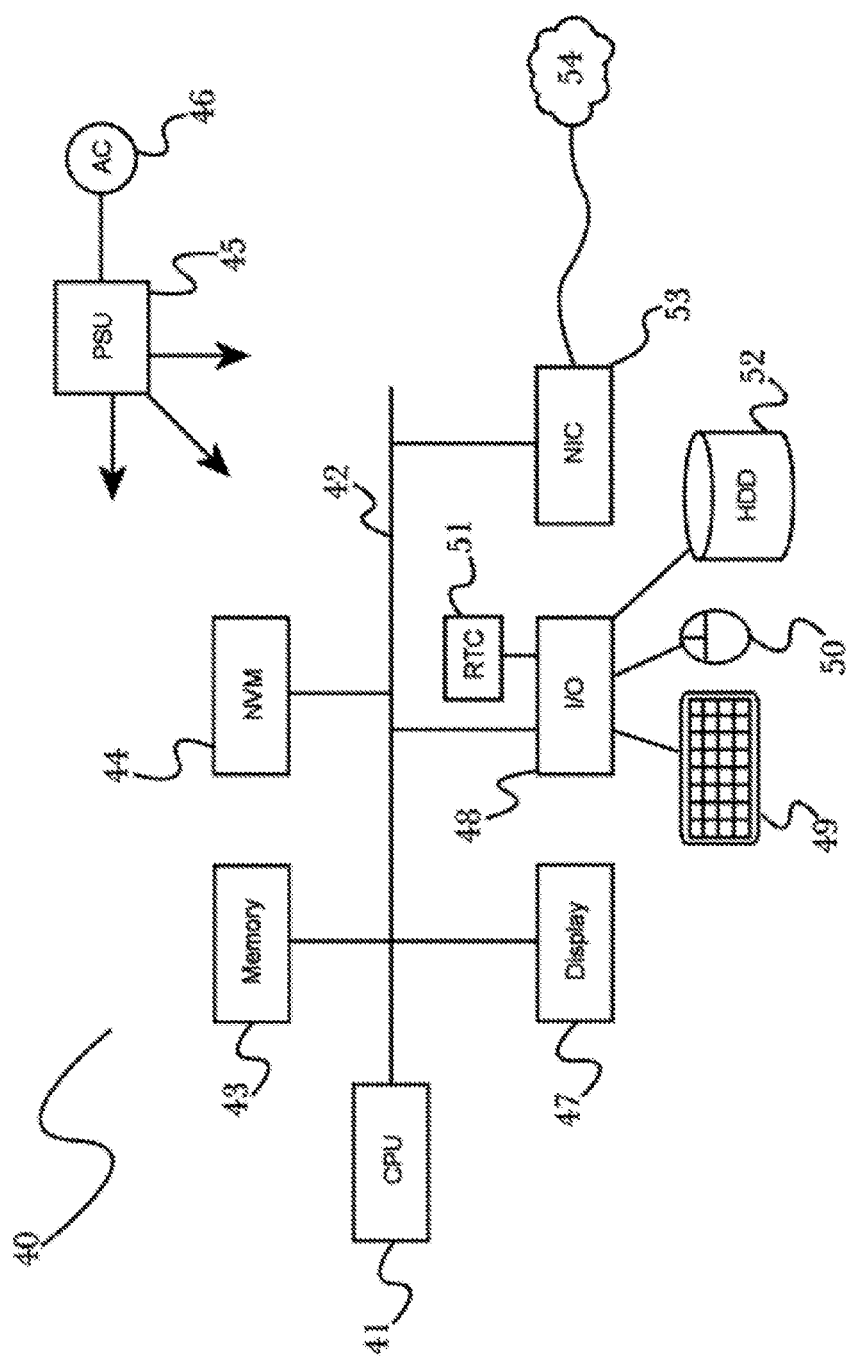
FIG. 14 is another block diagram illustrating an exemplary hardware architecture of a computing device used in various embodiments of the invention.

FIG. 14 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components Details of the Supervised Machine Learning Models The platform supports several supervised machine learning algorithms including:
- Distributed Random Forest
- Deep Learning
- Generalized Linear
- Gradient Boosted Machine
- Naive Bayes In addition, Stacking Ensemble learning is supported whereby a second-level "meta learner" is applied to a group of base learners. For example, a meta learner using the Generalized Linear Model can be applied on top of an ensemble of Deep Learning, Random Forest, Gradient Boosted Machine, and Generalized Linear Model.

Stacking is a way to build the most accurate predictive model for the probability of a transition between any two nodes of the reduced graph.

Inclusion of "Hidden" (Unobservable) States

In some cases, a state of the graph may not be directly observable (definable) using the input event data, but knowledge of such a state may be very important from the business point of view. An example of such a hidden state is the intent of the prospect. A skilled sales person will infer the intention from human interactions but there is no direct measure of "intent" available in the data. However, the platform supports the definition and computations with such hidden states in the graph by use of a Hidden Markov Model. This allows the hidden state(s) to be included in the reduced graph.

State Survival Analysis

The supervised machine learning models described above capture the probability of the state transition. However, unless state dwell time is included as an input attribute, they don't provide insight on the temporal character of the transition and do not take into account that the data is right-censored in time. A common approach is simply to look at the distribution of dwell times in a specific state. However a deeper insight and proper treatment of data censoring can be gained by applying statistical time-to-event or "Survival" analysis. In this point of view, a prospect "lives" in a certain state for a period of time before experiencing a "death" of instantaneous classification into another state. This enables a deeper stratification study of which attributes influence the time to transition and these can be used to accelerate the transition or select prospects who will transition more quickly.

As well as being able to compute survival function, hazard function and density, log-rank tests can be used to test the null hypothesis that the survival functions of any two groups of prospects are different for this particular transition.

Optimization Model

The optimizer is configured by the administrator to define the decision variables, objective function and constraints. Examples are provided below Decision Variables
- Which specific agents to assign to specific prospects
- The specific time and channel on which to contact a prospect
- A specific message to give to a prospect
- A specific experience to push to a prospect
- A specific transaction to propose to a prospect
- A specific state transition to recommend to a prospect Discussion of Constraints
- Maximum concurrent capacity of each sales representative. Typical sales reps cannot handle more than 8 concurrent opportunities.
- Balance utilization of sales reps.
- An upper budget limit may be posed as a constraint Discussion of Objective Functions
- E.g. expected profit (sales revenues less costs incurred)

Optimization Algorithm

The optimization problem here of sequential (multistage) stochastic optimization is extremely challenging. The platform uses a generic Approximate Dynamic Programming (ADP) framework with options for four different classes of optimization policy functions as listed below. Terminology in this area is quite fragment in both academia and industry but we point out that this approach is general and includes reinforcement learning and optimization by simulation as limiting cases.

Myopic Policies
- Optimize cost now but don't use forecasts or representation of future decisions Look-Ahead Policies
- Explicitly optimize over a future horizon with approx. future info and actions Policy Function Approximations
- Directly return an action in a given state (no imbedded optimization or forecast of future info)

Value Function Approximations (Greedy Policies)
- Approximation of the value of being in a future state as the result of a decision made now. Impact on future is solely in the value function Benefits of ADP Algorithm
- Scalable
- Can be used for decision under uncertainty
- Can be used where the utility function is not available in a closed for expression but is the result of simulation.

The skilled person will be aware of a range of possible modifications of the various embodiments described above. Accordingly, the present invention is defined by the claims and their equivalents.

What is claimed is:

1. A system for intelligent sales engagement, comprising:
a pre-integrated graph server comprising at least a processor, a memory, and a plurality of programming instructions stored in the memory and operating on the processor, wherein the programming instructions, when operating on the processor, cause the processor to:
   (a) monitor and capture events from source systems and constructs an event graph of multichannel interactions and attributes including firm demographics and sales rep attributes;
   (b) automatically reduce the graph to a plurality of state transitions;
   (c) run in modes where reducing the graph happens either periodically or continuously; and
   (d) support different pre-defined topologies of funnel, decision circle and journey;
a machine learning server comprising at least a processor, a memory, and a plurality of programming instructions stored in the memory and operating on the processor, wherein the programming instructions, when operating on the processor, cause the processor to:
   (e) train a family of predictive machine-learning models for any transition of interest of the reduced graph and performs validation of the accuracy of each predictive machine learning model;

(f) choose different model types for different transitions based on model with highest accuracy, model then estimates the conditional probability of the transition from the starting to ending state potentially including all known input attributes at the starting state;

(g) accept case determined numbers of input attributes of different types on each state transitions;

an optimization server comprising at least a processor, a memory, and a plurality of programming instructions stored in the memory and operating on the processor, wherein the programming instructions, when operating on the processor, cause the processor to:

(h) create a set of visualizations showing the various resulting performance metrics including conversion rate, representative utilization percentage, and total value in the pipeline;

(i) use the trained predictive models as input to an automated optimization phase which recommends specific actions to take to optimize the business outcome of prospects flowing through the reduced graph subject to constraints;

(j) support optimization under uncertainty;

(k) schedule interactions between agents and prospects to maximize an objective; and (l) configure, in addition to existing model optimization, optimization experiments that are executed and is then able to run experiments, analyze the results and self-learn giving rise to increased utility.

2. The system of claim 1, whereas the expected sales process may be entered as input to guide graph reduction and/or highlight deviations from expected flows.

3. The system of claim 1, wherein the graph may also represent business-to-business flows and business-to-consumer flows.

4. The system of claim 1 wherein the machine learning module may learn a process based on historical data.

5. The system of claim 1 wherein, the machine learning module may account for the multi-dimensional nature of social influence, and the role of advocates who aren't customers.

6. The system of claim 1 wherein, the machine learning module may shift to ongoing relationships beyond individual transactions.

7. The system of claim 1 wherein, the machine learning module runs in an adaptive mode where retraining happens periodically or continuously.

8. A method for intelligent sales engagement, the method comprising the steps of:

(a) monitoring and extracting sets of customer relationship sales data from source systems into a pre-integrated graph module comprising at least a plurality of programming instructions stored in a memory and operating on a processor of a network-connected computing device;

(b) constructing an event driven relational graph of multichannel interactions and attributes including firm demographics and sales rep attributes using the pre-integrated graph module;

(c) reducing the graph to a plurality of state transition occurrences, expressing the resultant graph in one of a plurality of pre-defined topologies, the plurality of pre-defined topologies including at least of: funnel, decision circle and engagement journey using the pre-integrated graph module;

(d) training a family of predictive machine-learning models for any transition of interest of the reduced graph and performs validation of the accuracy of each predictive machine learning model using a machine learning module comprising at least a plurality of programming instructions stored in a memory and operating on a processor of a network-connected computing device;

(e) choosing different model types using the machine learning module for different transitions based on model with highest accuracy, chosen model then estimates conditional probability of the transition from the starting to ending state potentially including all known input attributes at the starting state;

(f) running either full state history with attributes, Markov approximation or hidden Markov model or a hybrid mode using the machine learning module;

(g) creating a set of visualizations showing the various resulting performance metrics including conversion rate, rep utilization %, and total value in the pipeline using the optimization module;

(h) using the trained predictive models as input to an automated optimization phase which recommends specific actions to take to optimize the business outcome of prospects flowing through the reduced graph subject to constraints using the optimization module.

9. The method of claim 8, wherein the expected sales process may be entered as input to guide graph reduction and to highlight deviations from expected flows.

10. The method of claim 8, wherein the graph may also represent business-to-business flows and business-to-consumer flows.

11. The method of claim 8, wherein the machine learning module may learn a process based on historical data.

12. The method of claim 8, wherein the machine learning module may account for the multi-dimensional nature of social influence, and the role of advocates who aren't customers.

13. The method of claim 8, wherein the machine learning module may shift to ongoing relationships beyond individual transactions.

14. The method of claim 8, wherein the machine learning module runs in an adaptive mode where retraining happens periodically or continuously.

* * * * *